Patented May 21, 1940

2,201,228

UNITED STATES PATENT OFFICE 2,201,228

MANUFACTURE OF ALIPHATIC ACIDS

Henry Dreyfus, London, England

No Drawing. Application February 1, 1938, Serial No. 188,062. In Great Britain February 19, 1937

10 Claims. (Cl. 260—532)

This invention relates to the manufacture of oxygen containing compounds and is more particularly concerned with the production of acetic acid.

According to the invention acetic acid is produced by subjecting carbon monoxide to reaction with methyl alcohol vapour in the presence of certain substances exerting a catalytic action and dispersed in the gaseous phase. Such substances are those of an acidic or acidigenic nature. The invention is more particularly concerned with the use in this manner of phosphorus and its compounds, especially phosphorus oxy-acids, their ammonium salts and their N-substituted ammonium salts, e. g. pyridine salts, and other organic derivatives, for instance esters, e. g. the trimethyl and tri-ethyl phosphates, partially amidated phosphorus oxy-acids and their esters, and fully amidated phosphorus oxy-acids. Other compounds which may be employed are the phosphines, tetra-phosphonium bases or salts thereof, tri-phosphine oxides and organic acid compounds such as the acetyl-phosphoric acids.

The process may be carried out by passing a mixture of carbon monoxide and methyl alcohol vapour containing the desired catalyst dispersed therein through tubes or other apparatus heated to a suitable temperature. In general the temperature employed should be above 250° C., for instance 300–350° C., although higher temperatures, e. g. up to 450° C., may be employed if desired. The starting materials may be subjected to preheating before being introduced into the reaction zone.

The reaction zone should be made of or lined with a material which resists corrosion or which does not produce as a result of corrosion any substances liable to affect deleteriously the reaction. Copper may be employed since the presence of traces of copper compounds is beneficial in the process while the presence together of traces of both copper compounds and silver compounds is even more effective in promoting the reaction. Thus the reaction may be carried out in a tube containing a filling of copper, e. g. in the form of turnings or gauze, to which filling a silver compound has been applied or which has been plated, preferably upon part only of its surface, with silver. The use of a metal filling offers the advantage of assisting the attainment of uniform heating of the starting material. If desired the reaction vessel may be constructed of or lined with a material having substantially no effect of any sort on the reaction, for instance it may be plated with gold.

Where the catalyst employed is volatilisable it may be introduced into the starting materials in vapour form. For instance, carbon monoxide may be passed first through a vaporiser containing alcohol and maintained at a temperature such that the desired quantity of alcohol vapour is picked up by the carbon monoxide, and then through a second vaporiser containing the catalyst and maintained at a temperature such that the mixture of carbon monoxide and methyl alcohol vapour takes up a suitable quantity of catalyst vapour. Where the catalyst is not easily volatilisable a solution of the catalyst in a suitable solvent, for instance water, acetic acid or methanol, may be injected into the mixture of gases and vapours being supplied to the reaction zone.

Quite small amounts of the catalyst are sufficient to produce the desired result, for instance 0.1–0.5% of the weight of methyl alcohol employed, but larger quantities e. g. up to 1 or 2% of the weight of the methyl alcohol may be used if desired.

It is possible by means of the invention to obtain acetic acid from carbon monoxide and methyl alcohol at ordinary atmospheric pressure but a higher pressure, for instance up to 50 atmospheres, or even very high pressures of the order of 200 or 400 atmospheres, may be employed if desired.

The invention has been described more particularly in connection with the production from methyl alcohol and carbon monoxide of acetic acid. It is to be understood however that the invention is not limited to the production of the acetic acid in the free state and the acetic acid may be wholly, and is usually partly, in the form of methyl acetate. The presence of water vapour in the starting material favours the production of the free acid, quantities of water vapour equal to one-half to twice the volume of the methyl alcohol vapour being very suitable. Methyl acetate produced, and dimethyl ether which may also be contained in the products of the reaction may, if desired, be returned to the process for use as starting material in place of methyl alcohol. A larger proportion of water vapour is desirable in the starting materials when, apart from the carbon monoxide, they consist largely of methyl acetate and/or dimethyl ether than is the case when methyl alcohol only is present.

The invention may also be applied to the manufacture of aliphatic acids other than acetic acid, for instance by subjecting carbon monoxide to reaction with ethyl alcohol, propionic acid may be formed.

The following example illustrates the process of the invention:

*Example*

Methyl alcohol vapour and water vapour are introduced into a current of carbon monoxide by a passage thereof at a pressure of 150 atmospheres successively through two vaporisers, the first containing methyl alcohol and the second water. The mixture thus obtained is preheated to 300–325° C. and then passed, via a catchpot, into a copper reaction tube maintained at a temperature of 300–320° C. Into the catchpot there is sprayed a 10% solution of ammonium phosphate in water or methanol in a quantity such that the gas stream picks up ammonium phosphate equivalent to 0.2% of the weight of methyl alcohol passing.

The products are cooled and condensed and subjected to distillation to separate the acetic acid and methyl acetate formed.

Having described my invention, what I desire to secure by Letters Patent is:

1. Process for the manufacture of an aliphatic acid by subjecting carbon monoxide to reaction with a vapor of an aliphatic alcohol, wherein the reaction is carried out in the presence of at least traces of copper and a catalyst is dispersed in the reaction zone by introducing into the reactants a nitrogen compound of a oxy-acid of phosphorus.

2. Process for the maufacture of acetic acid by subjecting carbon monoxide to reaction with methyl alcohol vapor, wherein the reaction is carried out in the presence of at least traces of copper and a catalyst is dispersed in the reaction zone by introducing into the reactants a nitrogen compound of an oxy-acid of phosphorus.

3. Process for the manufacture of an aliphatic acid by subjecting carbon monoxide to reaction with the vapor of an aliphatic alcohol, wherein the reaction is carried out in the presence of at least traces of copper and of silver and a catalyst is dispersed in the reaction zone by introducing into the reactants a nitrogen compound of an oxy-acid of phosphorus.

4. Process for the manufacture of acetic acid by subjecting carbon monoxide to reaction with methyl alcohol vapor, wherein the reaction is carried out in the presence of at least traces of copper and of silver and a catalyst is dispersed in the reaction zone by introducing into the reactants a nitrogen compound of an oxy-acid of phosphorus.

5. Process for the manufacture of an aliphatic acid by subjecting carbon monoxide to reaction with a vapor of an aliphatic alcohol, wherein the reaction is carried out in the presence of at least traces of copper and a catalyst is dispersed in the reaction zone by introducing ammonium phosphate into the reactants.

6. Process for the manufacture of acetic acid by subjecting carbon monoxide to reaction with methyl alcohol vapor, wherein the reaction is carried out in the presence of at least traces of copper and a catalyst is dispersed in the reaction zone by introducing ammonium phosphate into the reactants.

7. Process for the manufacture of an aliphatic acid by subjecting carbon monoxide to reaction with a vapor of an aliphatic alcohol, wherein the reaction is carried out in the presence of at least traces of copper and a catalyst is dispersed in the reaction zone by introducing into the reactants a solution of a nitrogen compound of a oxy-acid of phosphorus.

8. Process for the manufacture of acetic acid by subjecting carbon monoxide to reaction with methyl alcohol, wherein the reaction is carried out in the presence of at least traces of copper and a catalyst is dispersed in the reaction zone by introducing into the reactants a solution of ammonium phosphate.

9. Process for the manufacture of acetic acid by subjecting carbon monoxide to reaction with methyl alcohol, wherein the reaction is carried out in the presence of at least traces of copper and a catalyst is dispersed in the reaction zone by introducing into the reactants an aqueous solution of ammonium phosphate.

10. Process for the manufacture of acetic acid by subjecting carbon monoxide to reaction with methyl alcohol vapor, wherein the reaction is carried out in the presence of at least traces of copper and of silver and a catalyst is dispersed in the reaction zone by introducing into the reaction zone an aqueous solution of ammonium phosphate.

HENRY DREYFUS.